US012164215B2

(12) United States Patent
Lee et al.

(10) Patent No.: US 12,164,215 B2
(45) Date of Patent: Dec. 10, 2024

(54) REFLECTIVE MODULE AND CAMERA MODULE COMPRISING SAME

(71) Applicant: LG INNOTEK CO., LTD., Seoul (KR)

(72) Inventors: Seung Hak Lee, Seoul (KR); Kyung Hwan Kim, Seoul (KR); Yu Jeong Cho, Seoul (KR)

(73) Assignee: LG INNOTEK CO. LTD., Seoul (KR)

( * ) Notice: Subject to any disclaimer, the term of this patent is extended or adjusted under 35 U.S.C. 154(b) by 108 days.

(21) Appl. No.: 18/020,107

(22) PCT Filed: Aug. 11, 2021

(86) PCT No.: PCT/KR2021/010646
§ 371 (c)(1),
(2) Date: Feb. 7, 2023

(87) PCT Pub. No.: WO2022/035216
PCT Pub. Date: Feb. 17, 2022

(65) Prior Publication Data
US 2023/0266643 A1    Aug. 24, 2023

(30) Foreign Application Priority Data
Aug. 11, 2020 (KR) .......................... 10-2020-0100444

(51) Int. Cl.
*H04N 23/58* (2023.01)
*G02B 7/182* (2021.01)
(Continued)

(52) U.S. Cl.
CPC ............. *G03B 17/12* (2013.01); *G02B 7/182* (2013.01); *G03B 17/17* (2013.01); *H04N 23/55* (2023.01);
(Continued)

(58) Field of Classification Search
CPC ..... G02B 7/182; G02B 13/0065; G03B 30/00
See application file for complete search history.

(56) References Cited

U.S. PATENT DOCUMENTS 6,992,969 B2 *   1/2006   Ito .................. G11B 7/1395
                                               369/112.29
8,849,107 B2 *   9/2014   Nomura ............... G03B 3/10
                                               348/340
(Continued)

FOREIGN PATENT DOCUMENTS

JP    2001-148137    5/2001
JP    2013-167818    8/2013
(Continued)

OTHER PUBLICATIONS

International Search Report dated Nov. 25, 2021 issued in Application No. PCT/KR2021/010646.
(Continued)

*Primary Examiner* — Leon W Rhodes, Jr.
(74) *Attorney, Agent, or Firm* — KED & ASSOCIATES

(57) ABSTRACT

A reflective module disclosed in an embodiment of the invention includes a holder having an inclined bottom surface and first and second guide portions disposed on both sides of the inclined bottom surface, a reflective mirror disposed on the holder, and an adhesive that adheres the reflective mirror to the holder, wherein the first guide portion and the second guide portion extend along both side surfaces of the reflective mirror, the first guide portion includes a plurality of first recesses, each of which faces one side surface of the reflective mirror; the second guide portion includes a plurality of second recesses, each of which faces the other side surface of the reflective mirror; and the adhesive may be respectively disposed in the plurality of (Continued)

first and second recesses and adhered to one side surface and the other side surface of the reflective mirror.

20 Claims, 10 Drawing Sheets

(51) Int. Cl.
 *G03B 17/12* (2021.01)
 *G03B 17/17* (2021.01)
 *H04N 23/55* (2023.01)
(52) U.S. Cl.
 CPC ....... *H04N 23/58* (2023.01); *G03B 2217/002* (2013.01)

(56) References Cited

U.S. PATENT DOCUMENTS

| | | | |
|---|---|---|---|
| 9,383,550 B2* | 7/2016 | Osborne | ................ H04N 23/67 |
| 2004/0103421 A1 | 5/2004 | Nakata et al. | |
| 2012/0033303 A1 | 2/2012 | Nagaoka et al. | |
| 2018/0332199 A1* | 11/2018 | Hu | ..................... G02B 13/0065 |
| 2018/0364450 A1 | 12/2018 | Lee et al. | |
| 2019/0121103 A1 | 4/2019 | Bachar et al. | |

FOREIGN PATENT DOCUMENTS

| | | |
|---|---|---|
| JP | 2015-064919 | 4/2015 |
| JP | 2016-095463 | 5/2016 |
| KR | 20-0150423 | 7/1999 |
| KR | 10-2017-0006731 | 1/2017 |
| KR | 10-2018-0125989 | 11/2018 |
| KR | 10-2019-0129798 | 11/2019 |
| KR | 10-2072811 | 3/2020 |

OTHER PUBLICATIONS

European Search Report dated Aug. 14, 2024 issued in Application No. 21856222.1.

* cited by examiner

REFLECTIVE MODULE AND CAMERA MODULE COMPRISING SAME

CROSS-REFERENCE TO RELATED PATENT APPLICATIONS

This application is a U.S. National Stage Application under 35 U.S.C. § 371 of PCT Application No. PCT/KR2021/010646, filed Aug. 11, 2021, which claims priority to Korean Patent Application No. 10-2020-0100444, filed Aug. 11, 2020, whose entire disclosures are hereby incorporated by reference.

TECHNICAL FIELD

An embodiment of the invention relates to a reflective module and a camera module.

BACKGROUND ART

Users of portable devices require optical devices that have high resolution, are small in size, and have various photographing functions. For example, the various imaging functions may mean at least one of an optical zoom function (zoom-in/zoom-out), an auto-focusing (AF) function, or an image stabilization function or an optical image stabilization (OIS) function. In the conventional case, in order to implement the aforementioned various photographing functions, a method of combining several lenses and directly moving the combined lenses has been used. However, when the number of lenses is increased in this way, the size of the optical device may increase.

In the lens module, the lenses are sequentially fixed in the lens holder, that is, when the lenses are mounted in the lens holder, it is almost impossible to adjust the position, so that the precision of the mounting process is very high, but the yield of the product is relatively low. As such, the lens module cannot satisfy the needs of multiple lenses, and the development of lenses must overcome these structural limitations. In addition, in the design and production process, not only theoretical optical design may be put into actual mass production, but also modules for providing good product yield are being studied.

In general, a camera module may be manufactured by including a plurality of lenses, a lens barrel accommodating the plurality of lenses, an image sensor that converts light signals passing through the plurality of lenses into electrical signals, a circuit board on which the image sensor is mounted, and a housing for fixing the lens barrel to the circuit board. Optical axis alignment between the plurality of lenses may be achieved by fitting or adhering the lenses to the lens barrel. In addition, in case of directly moving a barrel or a holder including a lens for image stabilization, both the weight of the lens itself and the weight of other members to which the lens is attached must be considered, so the movement requires a certain level of driving force, which increases power consumption.

DISCLOSURE

Technical Problem

An embodiment of the invention may provide a reflective module and a camera module in which the assembly of a reflective mirror and the holder is improved.

An embodiment of the invention may provide a reflective module and a camera module with improved adhesion between the reflective mirror and the holder.

An embodiment of the invention may provide a reflective module in which a reflective mirror is bonded to a recess of a guide portion of a holder with an adhesive, and a camera module having the same.

An embodiment of the invention may provide a reflective module for an image stabilization and a camera module having the same.

Technical Solution

A reflective module according to an embodiment of the invention includes a holder having an inclined bottom surface and first and second guide portions disposed on both sides of the inclined bottom surface, a reflective mirror disposed on the holder, and an adhesive that adheres the reflective mirror to the holder, wherein the first guide portion and the second guide portion extend along both side surfaces of the reflective mirror, the first guide portion includes a plurality of first recesses, each of which faces one side surface of the reflective mirror; the second guide portion includes a plurality of second recesses, each of which faces the other side surface of the reflective mirror; and the adhesive may be respectively disposed in the plurality of first and second recesses and adhered to one side surface and the other side surface of the reflective mirror.

According to an embodiment of the invention, the upper surfaces of the first and second guide portions are higher than the upper surface of the reflective mirror, and the bottoms of the first and second recesses may be lower than the upper surface of the reflective mirror and higher than a lower surface of the reflective mirror.

According to an embodiment of the invention, each of the first and second recesses may be three or more. Each of the first and second recesses includes a first surface inclined at an upper portion, a second surface inclined at a lower portion, and a bottom connecting the first surface and the second surface, and an angle between the first surface and the second surface may range from 80 to 90 degrees. An inner angle of each of the first to second recesses may be range from 80 degrees to 90 degrees.

According to an embodiment of the invention, the first surface may be inclined in a range of ±10 degrees with respect to a first axis orthogonal to the optical axis, and the second surface may be inclined with respect to the first axis by 90 degrees or less. Each of the first and second recesses may have a polygonal shape having a triangle.

According to an embodiment of the invention, the reflective module includes a plurality of spacers at each corner of the bottom surface of the holder to space a lower surface of the reflective mirror from the bottom surface. The holder may include stop protrusions on both sides of a lower end of the reflective mirror to prevent a movement of the reflective mirror.

According to an embodiment of the invention, the reflective module may include a first housing to which the holder is coupled to an inner portion; a holder guide portion coupled to a rear side of the holder and guiding rotation of the holder; a back cover coupled to the rear side of the holder guide portion; and a cover having an opening portion in a region opposite to an upper surface of the reflective mirror on an upper portion of the first housing. Each of the first housing and both side surfaces and lower portions of the holder includes a plurality of driving portions having coils and magnets opposed to each other, and the holder guide portion may include a plurality of first and second protrusions coupled to a groove disposed at the rear side of the holder and a groove disposed at a front side of the back cover.

A camera module according to an embodiment of the invention may include a lens module and an image sensor module aligned in the optical axis direction of the reflective module.

Advantageous Effects

In an embodiment of the invention, since the reflective mirror is adhered to both side walls of the holder with an adhesive, it is possible to suppress problems in which the reflective mirror is separated or the adhesive leaks out. In addition, the reflective mirror is adhered form the side surfaces thereof, the flatness of the reflective mirror may be improved. According to an embodiment of the invention, it is possible to improve the optical reliability of a reflective module having an image stabilization function and a camera module having the same. In addition, reliability of the camera module and a portable terminal having the same may be improved.

BEST MODE

Figure 1:
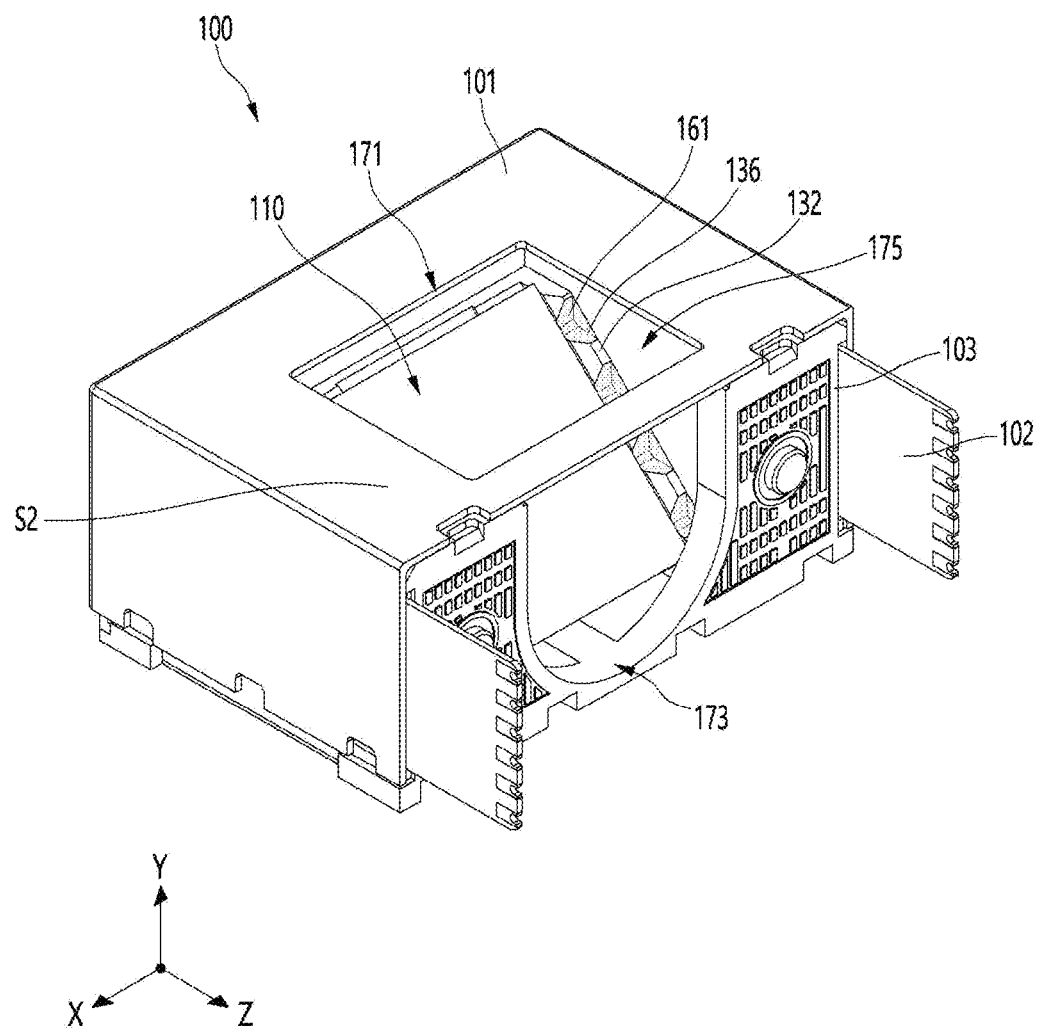
FIG. 1 is a perspective view of a reflective module according to an embodiment of the invention.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

A camera device including multiple lenses is mounted on a miniaturized mobile device such as a mobile terminal or vehicle, and it implements optical zoom function (zoom-in/zoom-out), auto-focusing (AF) function, and/or optical image stabilization (OIS) or hand-shake correction function by adjusting the distance between multiple lenses. In addition, several embodiments described below may be combined with each other unless specifically stated that they cannot be combined with each other. In addition, unless otherwise specified, descriptions for other embodiments may be applied to missing parts in the description of any one of several embodiments.

Figure 2:
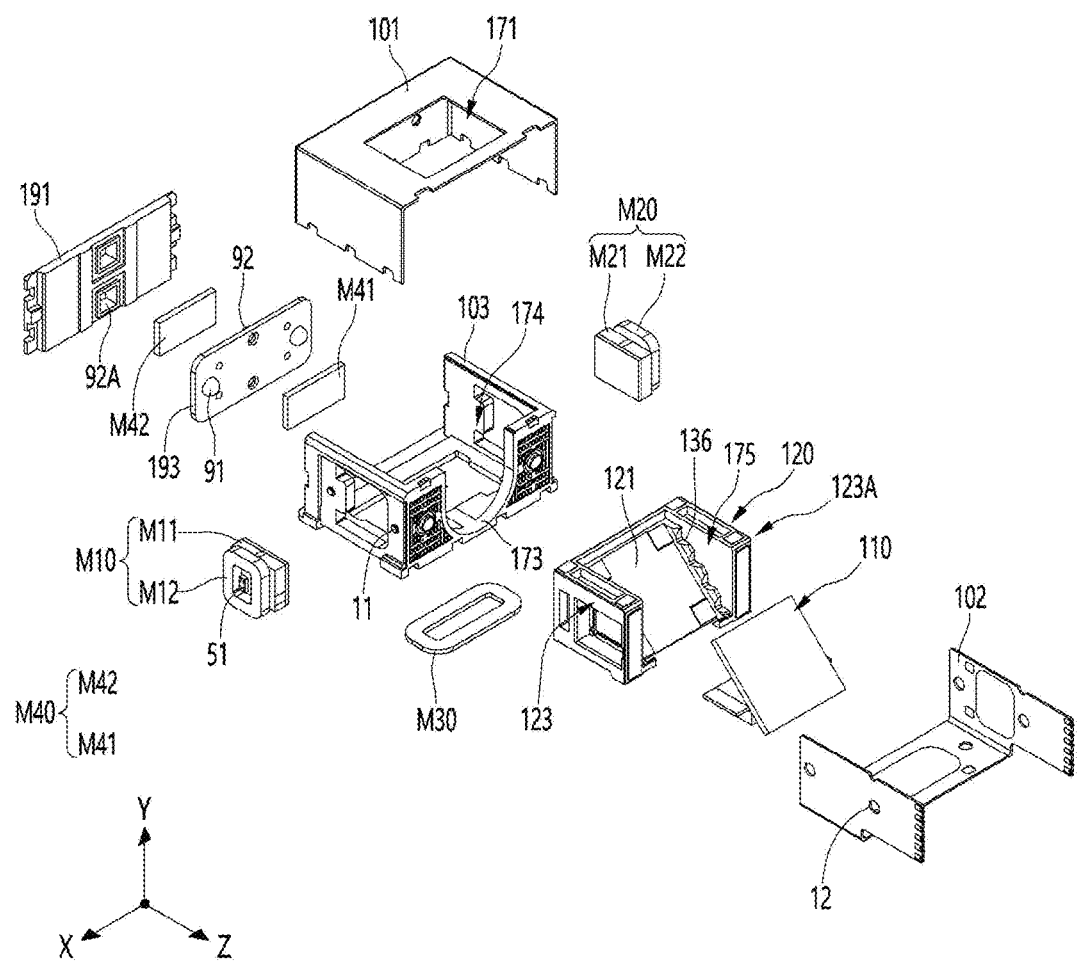
FIG. 2 is an exploded perspective view of the reflective module of FIG. 1.
Figure 3:
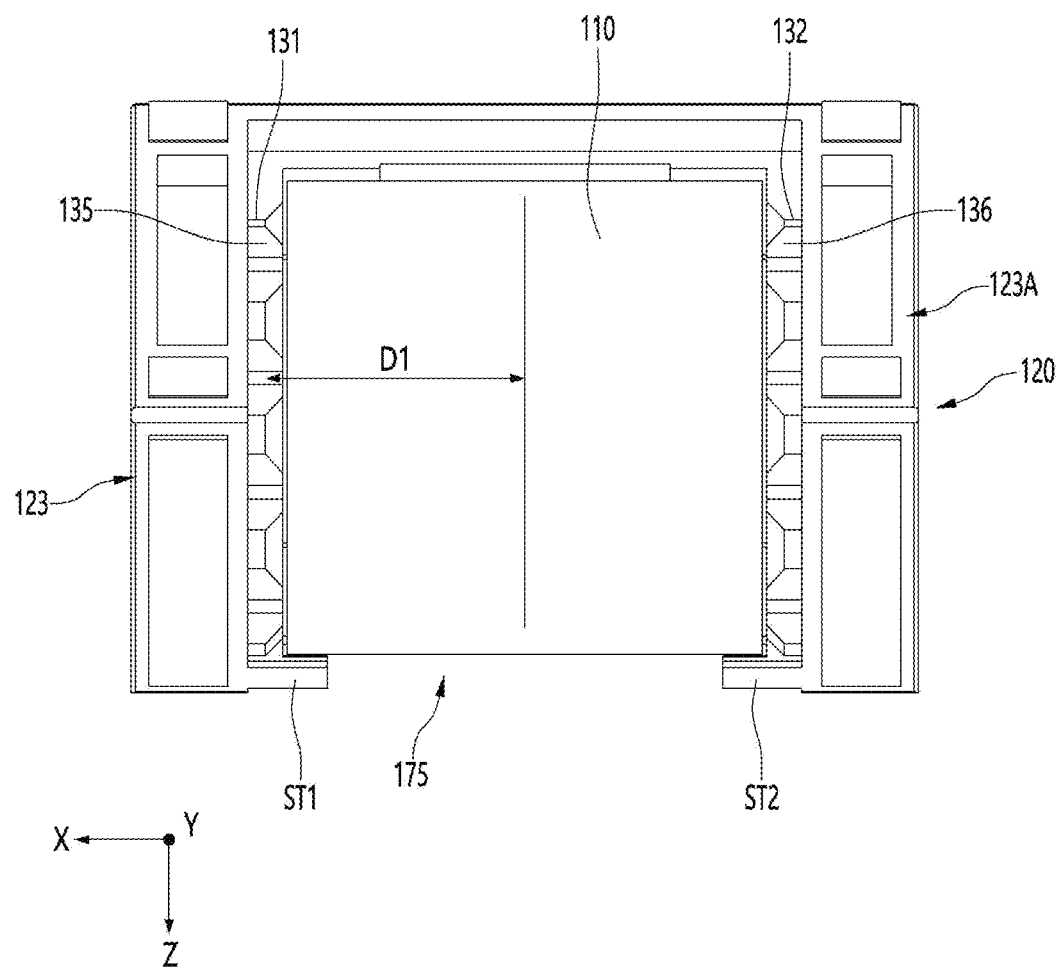
FIG. 3 is a plan view illustrating a reflective mirror and a recess in the reflective module of FIG. 2.
Figure 4:
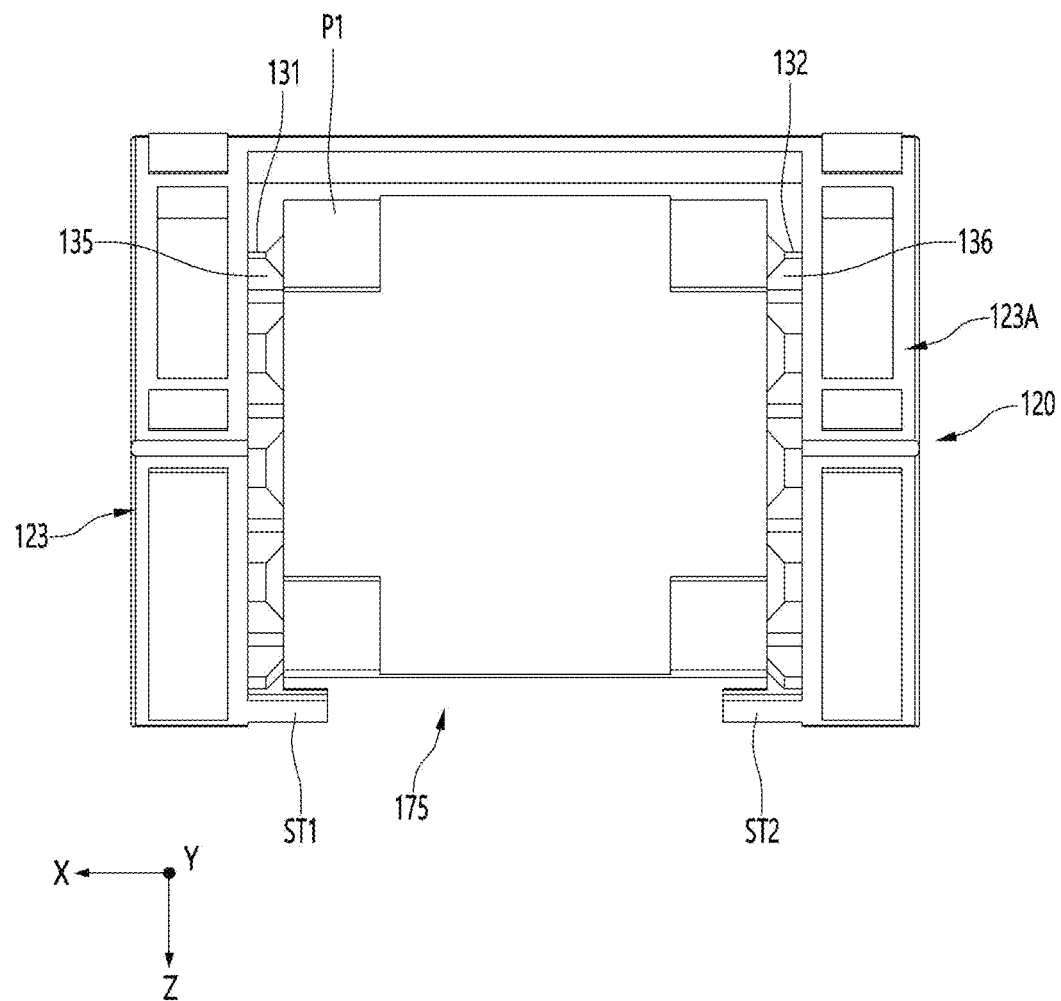
FIG. 4 is a plan view showing the bottom of the holder of FIG. 2.
Figure 5:
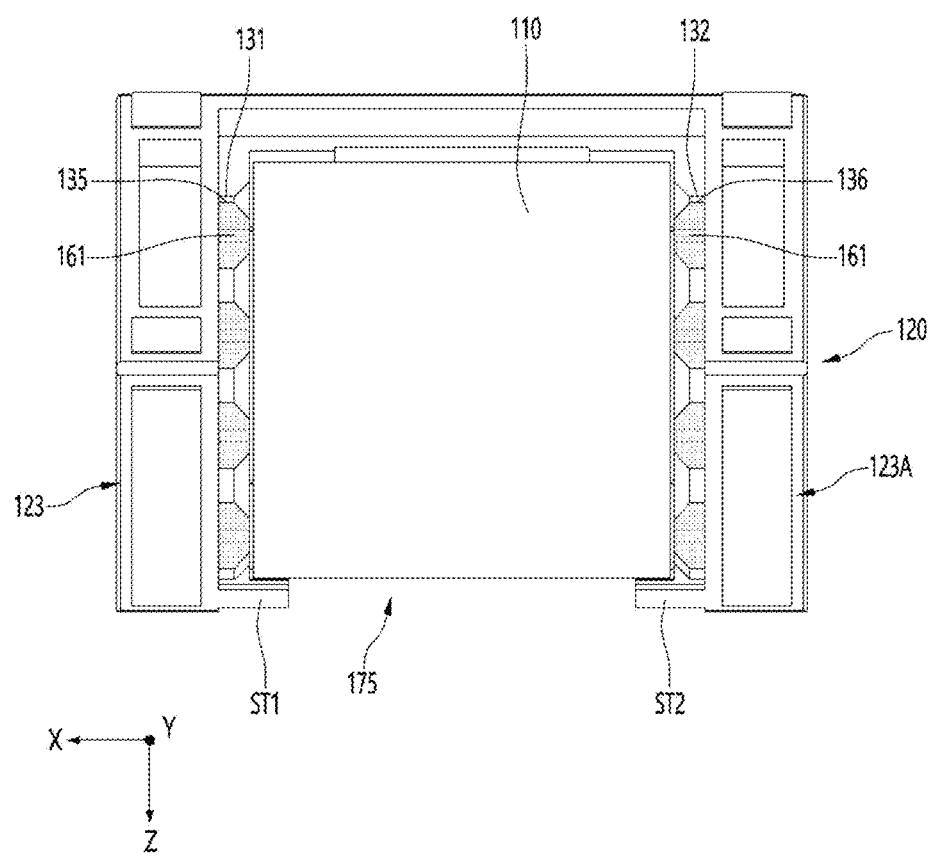
FIG. 5 is a plan view illustrating an adhesive of a reflective mirror and a recess in the reflective module of FIG. 2.
Figure 6:
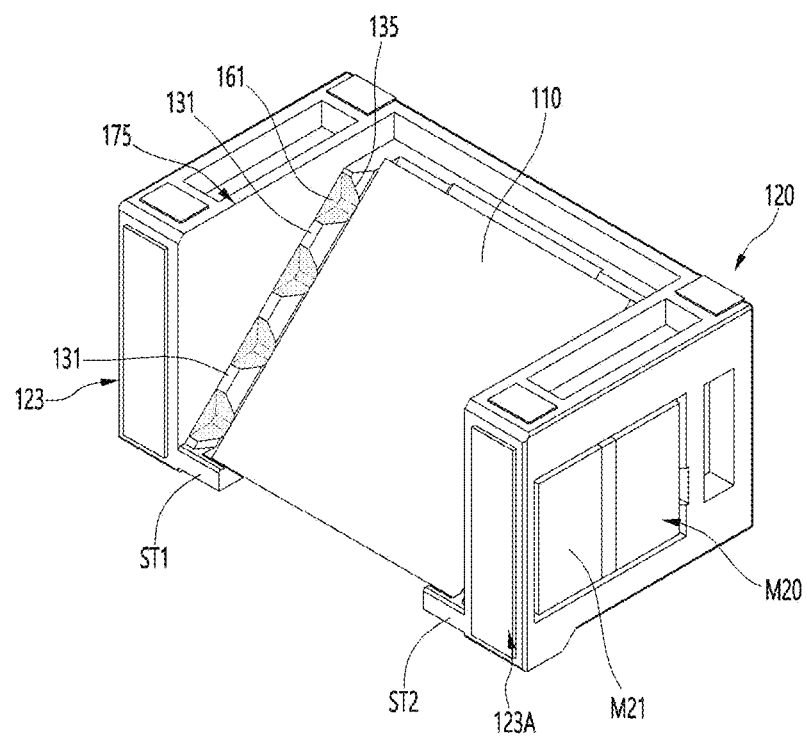
FIG. 6 is a perspective view of the holder of FIG. 5 viewed from the other side.
Figure 7:
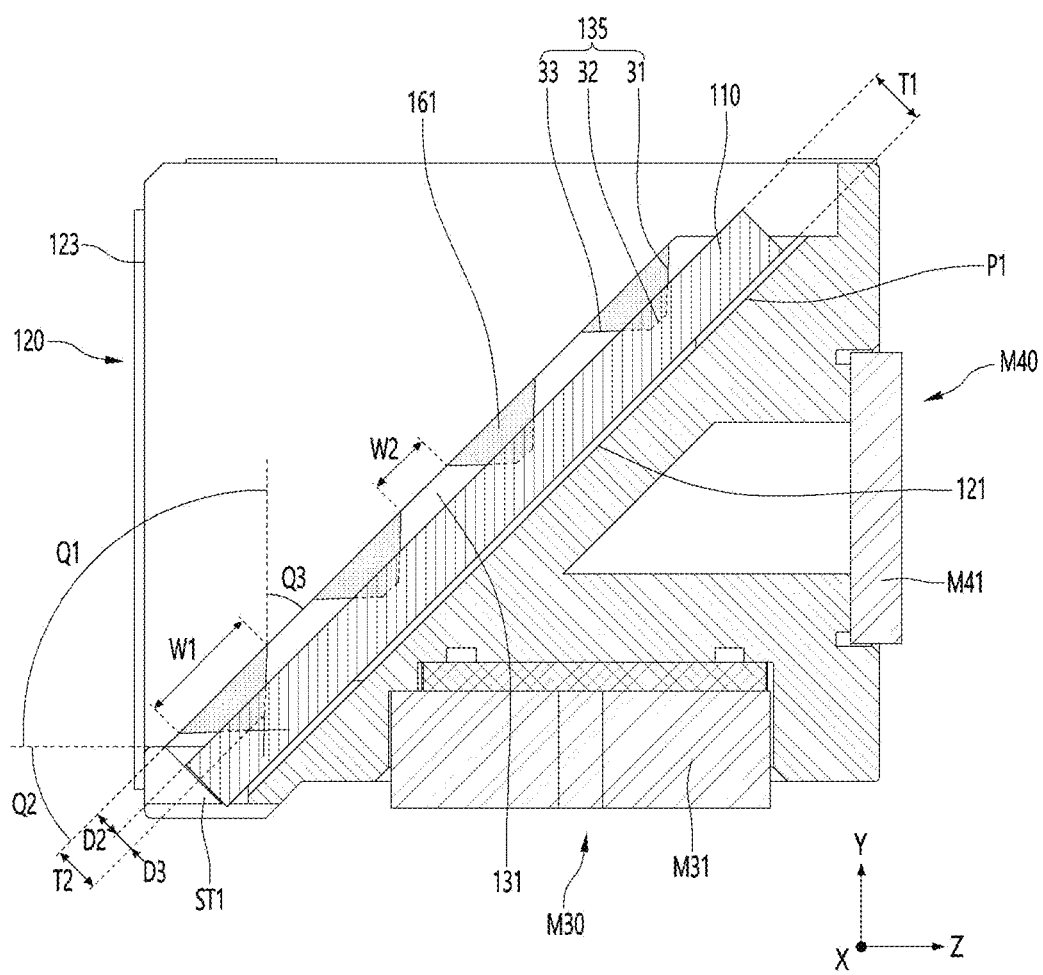
FIG. 7 is an example of a side cross-sectional view in which the holder of FIG. 5 and the reflective mirror are bonded with an adhesive.
Figure 8:
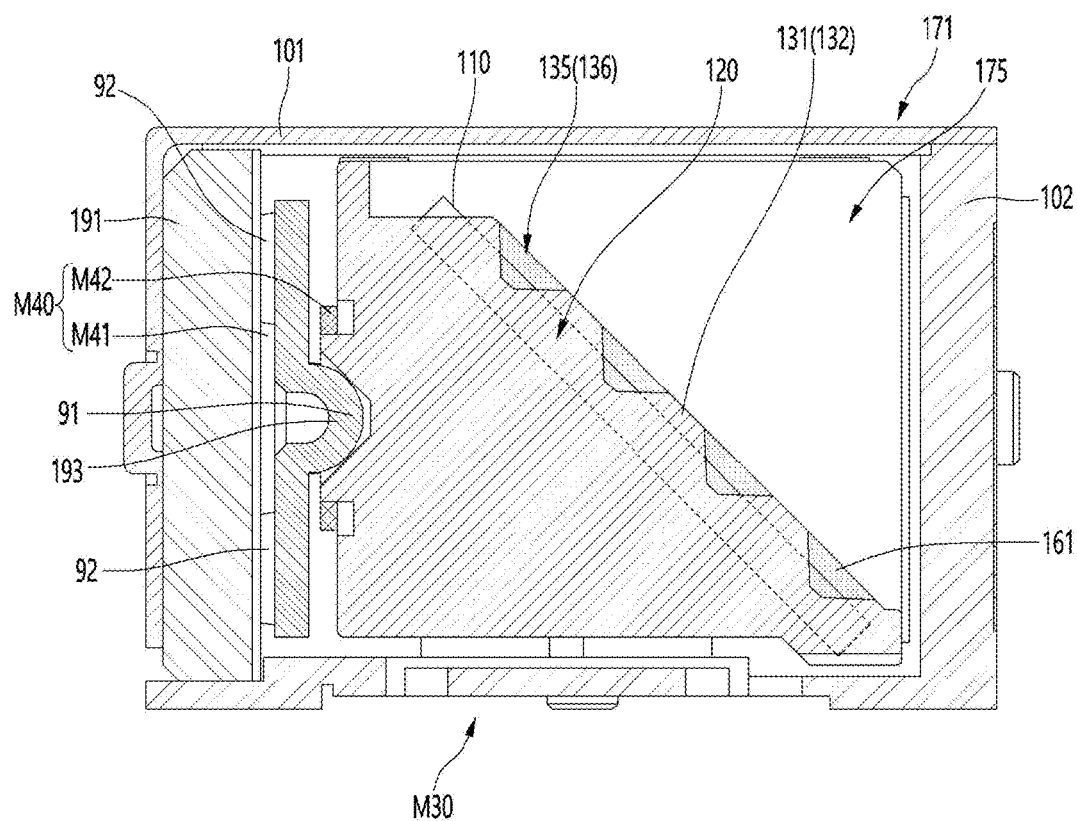
FIG. 8 is an example of another cross-sectional view in which the holder of FIG. 5 and the reflective mirror are bonded with an adhesive.

FIG. 1 is a perspective view of a reflective module according to an embodiment of the invention, FIG. 2 is an exploded perspective view of the reflective module of FIG. 1, FIG. 3 is a plan view showing a reflective mirror and a recess in the reflective module of FIG. 2, and FIG. 4 is a plan view showing the bottom of the holder of FIG. 2, FIG. 5 is a plan view showing the adhesive of the reflective mirror and the recess in the reflective module of FIG. 2, FIG. 6 is a perspective view of the holder of FIG. 5, FIG. 7 is an example of a side cross-sectional view in which the holder and the reflective mirror are bonded with an adhesive, and FIG. 8 is an example of a side cross-sectional view in which the holder and the reflective mirror in FIG. 5 are bonded with an adhesive.

Referring to FIGS. 1 to 8, the reflective module 100 according to an embodiment of the invention may be disposed in a camera module in a portable electronic device or a mobile body. The reflective module 100 reflects the incident light in the direction of the optical axis Z (FIG. 10) of the lenses of the camera module. Since the plurality of lenses of the camera module are disposed perpendicular to the thickness direction of the portable electronic device in the portable electronic device, the portable device equipped with the camera module may be miniaturized while having AF, zoom, and OIS functions. In addition, the camera module may include an inner lens holder in which a plurality of lenses is disposed between the reflective module 100 and the image sensor, and an outer lens holder having at least one lens between the reflective module 100 and the object. Hereinafter, for convenience of description, the reflective module 100 will be mainly described, and the reflective module 100 may include an image stabilization (OIS) function.

Referring to FIGS. 1 to 5, the reflective module 100 according to the embodiment of the invention includes a first housing 103, a holder 120 coupled to an inner portion of the first housing 103, a reflective mirror 110 coupled to an inner portion of the holder 120, a cover 101 having an opening portion and covering an upper portion and side portions of the first housing 103, a driving portions M10, M20, and M30 disposed on both side portions and/or lower portion of the first housing 103 and the holder 120, a substrate 102 disposed on the both side portions and the lower portion of the first housing 103 and electrically connected to the driving portions M10, M20, and M30, a holder guide portion 193 coupled to a rear side of the holder 120, and a back cover 191 coupled to a rear side of the holder guide portion 193.

Figure 10:
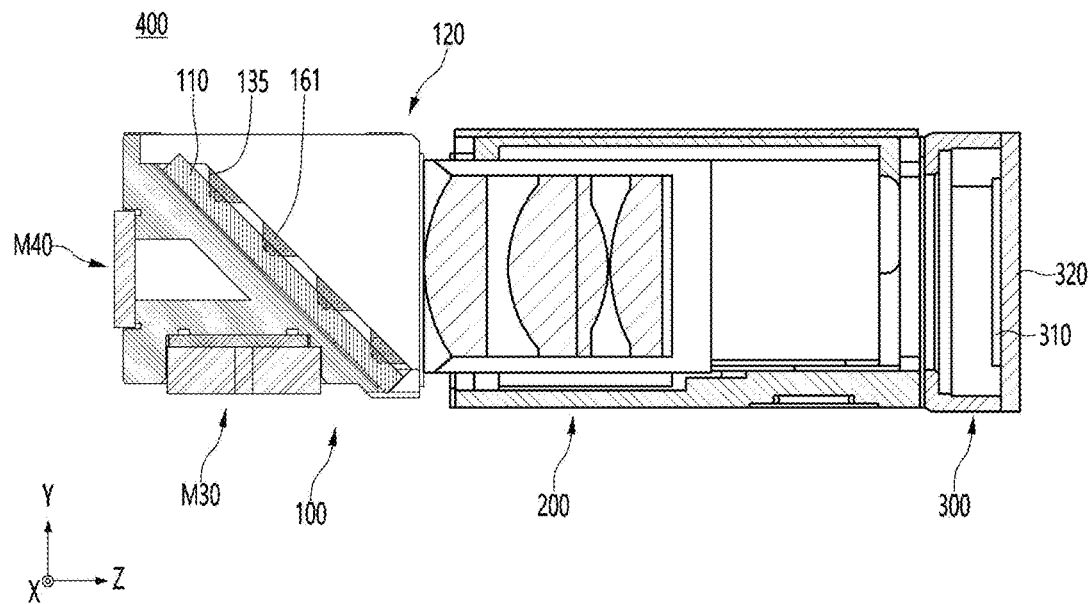
FIG. 10 is an example of a cross-sectional side view of a camera module having a reflective module of FIGS. 1 to 3.

In the first housing 103, the holder 120 may be coupled to the opening portion 171 and an inner portion 174 open to the front side in the direction of the optical axis Z (FIG. 10). Holes to which parts of the first and second driving portions M10 and M20 are coupled may be formed on both side surfaces of the first housing 103. Coupling protrusions 11 coupled to the coupling holes 12 of the substrate 102 may be formed on both side surfaces of the first housing 103. The holder 120 may have an opening portion 175 with an open front side and an open upper side, and may include an inclined bottom surface 121. The inclined bottom surface 121 may be inclined in a range of 40 degrees to 50 degrees, for example, at an angle of 45 degrees. The holder 120 has side walls 123 and 123A disposed on both sides thereof, and the reflective mirror 110 may be inserted and coupled between the inclined bottom surface 121 and the side walls 123 and 123A. The reflective mirror 110 may be coupled to the bottom surface 121 of the holder 120. The reflective mirror 110 may be a mirror having a thickness of 0.5 mm or less, for example, a mirror having a thickness of 0.3 mm or less. The reflective mirror 110 is made of glass and may have a rectangular plate shape. The reflective mirror 110 may perform incidence and reflection through a surface exposed to the outside or facing an object. The reflected light may proceed toward the lens module in an optical axis direction. The reflective mirror 110 may be inclined in a range of 40 degrees to 50 degrees, for example, at an angle of 45 degrees.

As shown in FIG. 4, the plurality of spacers P1 may be disposed on the bottom surface 121 of the holder 120, and the plurality of spacers P1 may space the lower surface of the reflective mirror 110 apart from the bottom surface 121. The spacer P1 may be disposed at each corner of the bottom surface 121 and may be bonded to the lower surface of the reflective mirror 110. As another example, the lower surface of the reflective mirror 110 may be bonded to the bottom surface 121 in a region that does not affect the reflection of light.

As shown in FIG. 3, the holder 120 may include a stop protrusions ST1 and ST2, and the stop protrusions ST1 and ST2 may be disposed to the front side of the holder 120 or the both sides of a lower end of the exit surface S2 of the reflective mirror 110. Each of the stop protrusions ST1 and ST2 may overlap the reflective mirror 110 by 0.3 mm or less, for example, in a range of 0.15 mm to 0.3 mm. When the stop protrusions ST1 and ST2 are smaller than the above range, it is difficult to support the reflective mirror 110. As shown in FIG. 7, the stop protrusions ST1 and ST2 may be inclined at an angle corresponding to the inclination angle of the outer side of the reflective mirror 110, and the outer side of the reflective mirror 110 may be in close contact with the stop protrusions ST1 and ST2. The outer wall of the holder 120 may protrude higher than the upper surface of the reflective mirror 110 at an outer side of the upper end of the bottom surface 121. The holder 120 may be made of a plastic or polymer material, for example, a liquid crystal crystalline polymer (LCP) material.

As shown in FIGS. 2 and 8, the holder guide portion 193 has a polygonal plate shape and may be coupled between the back cover 191 and the holder 120. The first protrusion 91 of the holder guide portion 193 may be coupled to a groove of the holder 120 and the second protrusion 92 may be coupled to a groove 92A of the back cover 191. The holder guide portion 193 is disposed at the rear side of the holder 120 and the first protrusions 91 of the holder guide portion 193 are coupled to the rear groove of the holder 120 to guide rotation in the second axis Y direction based on the first axis X direction of the holder 120. At the rear side of the holder guide portion 193, the second protrusions 92 are coupled to the back cover 191 in the form of grooves/protrusions, and the second protrusions 92 guide the rotation of the holder guide portion 193 and the holder 120 in the first axis X direction with respect to the second axis Y. For example, the first protrusion 91 is spaced apart in the horizontal left/right direction (X axis) from the center of the front surface (inner surface) of the holder guide portion 193, and the second protrusion 92 may be spaced apart in a vertical up/down direction (Y axis) from the center of the rear surface (outside surface) of the holder guide portion 193. Accordingly, the first protrusion 91 and the second protrusion 92 may guide the holder 120 moving in up/down/left/right directions. A plurality of grooves 92A are disposed on an inner surface of the back cover 191, that is, a surface opposite to the holder guide portion 193, and the grooves 92A may be respectively disposed above and below the vertical direction (Y axis) with respect to the center line. The grooves and the first and second protrusions 91 and 92 may have a hemispherical shape.

The cover 101 may have an opening portion 171 therein facing the upper surface of the reflective mirror 110 and side portions bent to both sides of the first housing 103. The cover 101 may be made of metal or plastic. The substrate 102 extends from the bottom of the first housing 103 toward both sides of the first housing 103, that is, may extend between both sides of the first housing 103 and side portions of the cover 101, respectively. The substrate 102 extends to both side surfaces and the lower surface of the first housing 103, and may be electrically connected to the coils and position sensors 51 of each driving portions M10, M20, and M30. The driving portions M10, M20 and M30 may each include a VCM actuator or a piezoelectric element.

As shown in FIGS. 2 and 6, a first driving portion M10 and a second driving portion M20 are disposed on opposite sides of each other of the first housing 103 and the holder 120, and the first driving portion M10 may include a mover M11 disposed on the first side of the holder 120 and a stator M12 disposed on the first housing 103 opposite to the first side. The second driving portion M20 may include a mover M21 disposed on the second side of the holder 120 and a stator M22 disposed on the first housing 103 opposite to the second side. The movers M12 and M22 of the first and second driving portions M10 and M20 may include magnets, and the stators M11 and M21 may include coils. When power is applied to the coils of the first and second driving portions M10 and M20, a driving force is generated in the direction of the first axis X, and the holder 120 rotates based the direction of the second axis Y. Here, the stators M12 and M22 of the first and second driving portions M10 and M20 are electrically connected to each side of the substrate 102, and the position sensors 51 may be disposed inside the stators M12 and M22 and connected to the substrate 102.

As shown in FIGS. 7 and 8, a third driving portion M30 is disposed under the first housing 103 and the holder 120, and the third driving portion M30 may include a mover M31 under the holder 120 and a stator M32 at the bottom of the first housing 103. The mover M31 of the third driving portion M30 may include a magnet, and the stator M32 may include a coil. When power is applied to the coil of the third driving portion M30, a driving force is generated in the direction of the second axis Y, and the holder 120 is rotated in the direction of the second axis Y based on the first axis X direction. A position sensor 51 may be disposed inside the coil of the third driving portion M30. The position sensors 51 disposed in the first to third driving portions M10, M20, and M30 may be hall sensors for closed-loop control that detects and feeds back the position of the holder 120 when the holder 120 is rotated.

As shown in FIGS. 2 and 8, the first mover M41 is disposed on a rear side of the holder 120 and the second mover M42 is disposed on a rear side of the holder guide portion 193, both of the second movers M41 and M42 may be magnets, or the first mover M41 may be a magnet and the second mover M42 may be a coil. The first and second movers M41 and M42 exert a repulsive force or attractive force on each other, and the holder 120 may support rotation about the first axis X and/or the second axis Y by the driving force of the first to third driving portions M10, M20, and M30 in contact with the first housing 103.

Meanwhile, as shown in FIGS. 3 to 8, describing at the combination of the holder 120 and the reflective mirror 110, the inner sides of both side walls 123 and 123A of the holder 120 may include the guide portions 131 and 132 along both side surfaces of the reflective mirror 110. The inner sides of the guide portions 131 and 132 may face both side surfaces of the reflective mirror 110, respectively. As shown in FIG. 7, the height or thickness (>T2) of the guide portions 131 and 132 may protrude thicker or higher than the thickness T1 of the reflective mirror 110 based on the bottom surface 121. As shown in FIG. 3, the guide portions 131 and 132 may be spaced apart from the center of the reflective mirror 110 by a distance D1 equal to or greater than 50% of the length of one side in the direction of the first axis X.

As shown in FIG. 6, the lengths of the guide portions 131 and 132 may be shorter than the length of the upper surface of the reflective mirror 110. A distance between the first guide portion 131 and the second guide portion 132 may be greater than the width of the reflective mirror 110. The width of the reflective mirror 110 is the length in a direction perpendicular to the longitudinal direction.

Both side surfaces of the reflective mirror 110 may be adhered to the guide portions 131 and 132 by an adhesive 161. The guide portions 131 and 132 may have a plurality of recesses 135 and 136 or grooves in which the adhesive 161 is accommodated may be disposed in regions corresponding to side surfaces of the reflective mirror 110. Each of the first and second guide portions 131 and 132 may have a width of 0.3 mm or more, for example, 0.3 mm to 0.6 mm or 0.3 mm to 0.5 mm. The width of each of the first and second guide portions 131 and 132 is a length extending outward from each side surface of the reflective mirror 110. The plurality of recesses 135 and 136 spaced apart from each other are disposed in each of the first and second guide portions 131 and 132, and three or more of the plurality of recesses 135 and 136 may be disposed in each of the first and second guide portions 131 and 132. The plurality of first recesses 135 may be disposed in the first guide portion 131 and disposed along one side surface of the reflective mirror 110, and the plurality of second recesses 136 may be disposed in the second guide portion 132 and disposed along the other side surface of the reflective mirror 110.

As shown in FIGS. 7 and 8, a depth T2 of the first and second recesses 135 and 136 is the depth from the upper surface to the bottom of the first and second guide portions 131 and 132, and may be formed in a range of 0.4 mm±0.2 mm. The width W1 of the first and second recesses 135 and 136 may be greater than the depth T2 and may be greater than or equal to 0.6 mm, for example, in the range of 0.6 mm to 2 mm or in the range of 0.7 mm to 1 mm. The distance W2 between the upper surfaces of the first and second recesses 135 and 136 may be greater than the depth T2 and may be greater than or equal to 0.5 mm, for example, in the range of 0.5 mm to 2 mm or in the range of 0.6 mm to 1 mm. An adhesion area between the adhesive 161 filled in the first and second recesses 135 and 136 and the reflective mirror 110 may be secured by the depth T2 and width W1 of the first and second recesses 135 and 136, and the number of first and second recesses 135 and 136 may be three or more within the length of the reflective mirror 110 by the distance W2 and the width W1.

Heights of upper surfaces of the guide portions 131 and 132 may be higher than those of the upper surface of the reflective mirror 110, and bottoms of the recesses 135 and 136 may be higher than lower surfaces of the reflective mirror 110 and lower than the upper surface of the reflective mirror 110. Each of the first and second recesses 135 and 136 has an inner angle Q1 of 90 degrees or less, for example, in a range of 80 to 90 degrees, and when a liquid adhesive 161 is applied, the liquid adhesive may prevent outflow in a downward direction and may be provided in a wider recess width.

Each of the first and second recesses 135 and 136 may include an inclined first surface 31, a second surface 32, and a bottom 33 between the first surface 31 and the second surface 32. The first surface 31 may be inclined at the same angle as the second axis Y or disposed within a range of ±10 degrees relative to the second axis Y. The second surface 32 faces the first surface 31 and is inclined at the same angle as the optical axis Z or disposed within a range of −10 degrees relative to the optical axis Z (e.g., 80 degrees to 90 degrees relative to the Y axis). When the second surface 32 is out of the optical axis Z, a problem in that the adhesive 161 flows down may occur. That is, the angle Q3 between the straight line extending along the first surface 31 and the straight line extending the upper surfaces of the guide portions 131 and 132 or the straight line extending the upper surface of the reflective mirror 110 may be in a range of 45 degrees ±5 degrees. That is, the angle Q2 between a straight line extending along the second surface 33 and a straight line extending the upper surfaces of the guide portions 131 and 132 or a straight line extending the upper surface of the reflective mirror 110 may be 45 degrees or less, for example, in a range from 40 degrees to 45 degrees. The bottom 33 on the first and second recesses 135 and 136 is connected between the first surface 31 and the second surface 32, and may be provided as an inclined flat surface or formed without a flat surface. Side cross sections of the first and second recesses 135 and 136 may have a triangular or polygonal shape.

Figure 9:
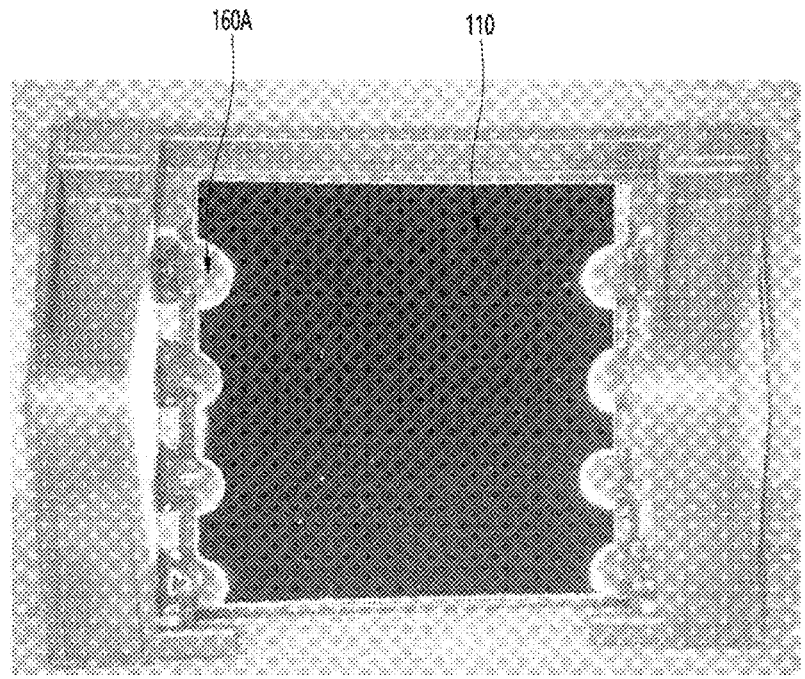
FIG. 9 is a view showing a state after an external shock to the holder and the reflective mirror bonded with an adhesive in the reflective module of FIG. 5.

A region D3 overlapping the reflective mirror 110 within the depths T2 of the first and second recesses 135 and 136 may be equal to or smaller than a non-overlapping region D2. Accordingly, when the adhesive 161 is applied to each of the first and second recesses 135 and 136, the adhesive 161 may adhere to different regions on both side surfaces of the reflective mirror 110. Accordingly, it is possible to prevent a problem in which the reflective mirror 110 moves or separates. The adhesive 161 may extend on a part of the upper or lower surface of the reflective mirror 110. As shown in FIG. 9, a portion 160A of the adhesive 161 may extend to a portion of the upper or lower surface of the reflective mirror 110.

The adhesive 161 may be filled in the same plane as the upper surfaces of the first and second guide portions 131 and 132 or disposed higher or lower than the upper surfaces of the first and second guide portions 131 and 132. The adhesive 161 according to an embodiment of the invention may include a UV adhesive or a heat curable adhesive. As another example, the adhesive 161 may include a first adhesive disposed in the recesses 135 and 136 and a second adhesive disposed on the first adhesive. The first adhesive may be a UV adhesive having excellent adhesion to glass, and the second adhesive may be a heat curable adhesive having excellent adhesion to a plastic material, which is the same material as the holder. As another example, the second adhesive may be bonded to the upper surfaces of the guide portions 131 and 132 and an upper end of the side surface of the reflective mirror 110.

As shown in FIG. 10, a camera module 400 according to an embodiment of the invention may include the reflective module 100, a lens module 200 and an image sensor module 300. The lens module 200 and the image sensor module 300 may be aligned along the optical axis of the reflective module 100. A plurality of lenses may be aligned in a lens holder in the lens module 200, and an image sensor 310 may be attached to the image sensor module 300 on the main substrate 320. The plurality of lenses may be disposed in one lens holder or may be separated in at least two lens holders. In addition, the lens module 200 may include an actuator having an AF function or/and an OIS function around the lens holder, but is not limited thereto. By arranging the optical axes of the lenses of the lens module 200 in a direction orthogonal to the thickness of the portable electronic device, a high-resolution camera module may be provided without increasing the thickness of the portable electronic device.

Figure 11:
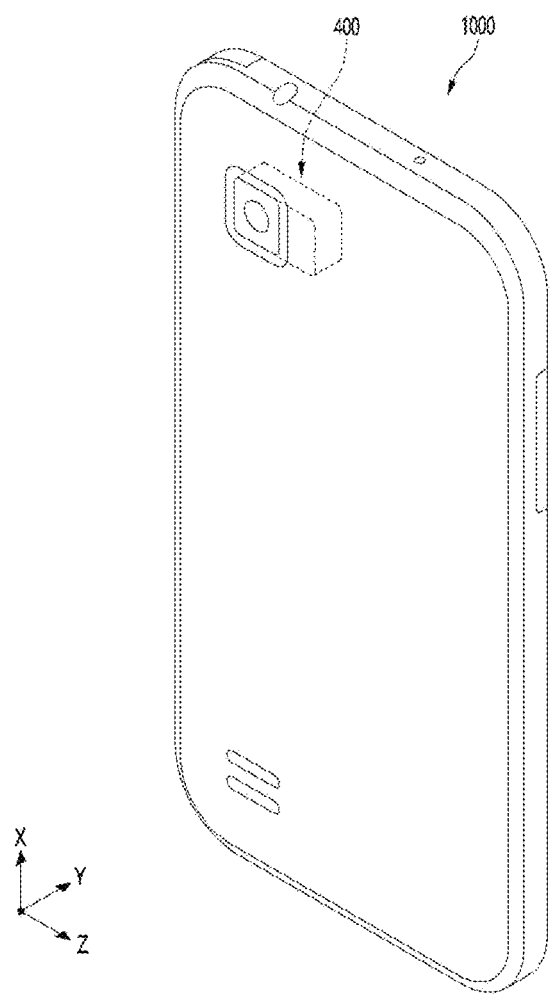
FIG. 11 is an example of a portable electronic device having the camera module of FIG. 10.

Referring to FIG. 11, a portable electronic device 1000 according to an embodiment of the invention may be a portable electronic device such as a mobile communication terminal equipped with a camera module 400, a smart phone, or a tablet PC. As another example, a portable electronic device may be a moving mobile device such as a vehicle. The portable electronic device 1000 is equipped with a camera module 400 to photograph a subject. The camera module 400 includes a plurality of lenses. In an embodiment of the invention, the camera module 400 is arranged so that the optical axis (Z-axis) of a plurality of lenses is perpendicular to the thickness direction (Y-axis direction, from the front surface of the portable electronic device 1000 to the rear surface or the opposite direction) of the portable electronic device 1000. For example, the optical axis (Z-axis) of the plurality of lenses provided in the camera module 400 may be formed in a width direction or a length direction of the portable electronic device 1000. Therefore, even if the camera module 400 has functions such as auto focusing (AF), zoom, and optical image stabilizing (OIS), the thickness of the portable electronic device 1000 may not be increased.

Accordingly, miniaturization of the portable electronic device 1000 is possible. The camera module 400 according to an embodiment of the invention may include at least one of AF, Zoom, and OIS functions. In the case of the camera module 400 having AF, Zoom, and OIS functions, the size of the camera module is increased compared to a general camera module. When the size of the camera module 400 increases, the portable electronic device 1000 on which the camera module 400 is mounted is also affected, and thus there is a limit to miniaturizing the portable electronic device 1000. For example, the camera module should form a long lens group for the zoom function, and when the optical axis (Z-axis) of the lens group is formed in the thickness direction of the portable electronic device, the thickness of the portable electronic device also increases according to the length of the lens group.

When the thickness of the portable electronic device is not increased, the length of the lens group cannot be formed sufficiently long, and zoom performance is weakened. In addition, in order to implement the AF and OIS functions, an actuator for moving the lens group in the direction of the optical axis or in a direction perpendicular to the optical axis must be installed. The optical axis (Z axis) of the lens group is formed in the thickness direction of the portable electronic device. In this case, the actuator for moving the lens group must also be installed in the thickness direction of the portable electronic device. Accordingly, the thickness of the portable electronic device increases. However, since the camera module 400 according to the embodiment of the invention is arranged such that optical axis (Z-axis) of the plurality of lenses is perpendicular to the thickness direction of the portable electronic device 1000, so that the portable electronic device 1000 may be miniaturized while having AF, Zoom and OIS functions.

Features, structures, effects, etc. described in the embodiments above are included in at least one embodiment of the present invention, and are not necessarily limited to only one embodiment. Furthermore, the features, structures, and effects illustrated in each embodiment can be combined or modified with respect to other embodiments by those skilled in the art in the field to which the embodiments belong. Therefore, contents related to these combinations and variations should be construed as being included in the scope of the present invention. Although described based on the embodiments, this is only an example, this invention is not limited, and it will be apparent to those skilled in the art that various modifications and applications not illustrated above are possible without departing from the essential characteristics of this embodiment. For example, each component specifically shown in the embodiment can be modified and implemented. And the differences related to these modifications and applications should be construed as being included in the scope of the present invention as defined in the appended claims.

The invention claimed is:

1. A reflective module comprising:
    a holder having an inclined bottom surface, and first and second guide portions disposed on both sides of the inclined bottom surface;
    a reflective mirror disposed on the holder; and
    an adhesive that adheres the reflective mirror to the holder, wherein the first guide portion and the second guide portion extend along both side surfaces of the reflective mirror, wherein the first guide portion includes a plurality of first recesses facing one side surface of the reflective mirror, respectively, and spaced apart from each other, wherein the second guide portion includes a plurality of second recesses facing the other side surface of the reflective mirror, respectively, and spaced apart from each other, wherein the adhesive is respectively disposed in the plurality of first and second recesses and adheres to the one side surface and the other side surface of the reflective mirror, wherein the reflective mirror is coupled to the inclined bottom surface of the holder, and wherein the adhesive is adhered to different regions of the one side surface and the other side surface of the reflective mirror, respectively.

2. The reflective module of claim 1, wherein upper surfaces of the first and second guide portions are higher than upper surface of the reflective mirror, and bottoms of the first and second recesses are lower than the upper surface of the reflective mirror and higher than lower surface of the reflective mirror.

3. The reflective module according to claim 2, wherein a number of the first and second recesses is three or more.

4. The reflective module of claim 3, wherein each of the first and second recesses includes a first surface inclined at an upper portion, a second surface inclined at a lower portion, and a bottom connecting the first surface and the second surface, and wherein an angle between the first surface and the second surface is in a range of 80 degrees to 90 degrees.

5. The reflective module of claim 3, wherein an inner angle of each of the first to second recesses is in a range of 80 degrees to 90 degrees.

6. The reflective module of claim 4, wherein the first surface is inclined in a range of ±10 degrees with respect to a first axis orthogonal to an optical axis, and wherein the second surface is inclined at 90 degrees or less with respect to the first axis.

7. The reflective module of claim 5, wherein each of the first and second recesses includes a polygonal shape having a triangle.

8. The reflective module of claim 3, further comprising a plurality of spacers at each corner of the bottom surface of the holder to space a lower surface of the reflective mirror from the bottom surface.

9. The reflective module of claim 1, wherein the holder includes stop protrusions on both sides of a lower end of the reflective mirror to prevent a movement of the reflective mirror.

10. The reflective module of claim 1, comprising a first hosing to which the holder is coupled to an inner portion;

a holder guide portion coupled to a rear side of the holder and guiding rotation of the holder;

a back cover coupled to a rear side of the holder guide portion; and a cover having an opening portion in a region opposite to an upper surface of the reflective mirror on an upper portion of the first housing.

11. The reflective module of claim 10, wherein each of the first housing and both side surfaces and lower portions of the holder include a plurality of driving portions having coils and magnets facing each other, and wherein the holder guide portion includes a plurality of first and second protrusions coupled to a groove disposed at the rear side of the holder and a groove disposed at a front side of the back cover.

12. A camera module comprising a lens module and an image sensor module aligned in an optical axis direction of the reflective module according to claim 11.

13. A reflective module comprising:

a holder having an inclined bottom surface, and first and second guide portions disposed on both sides of the inclined bottom surface;

a plurality of driving portions disposed outside the holder;

a reflective mirror disposed on the inclined bottom surface of the holder; and an adhesive that adheres the reflective mirror to the holder, wherein the first guide portion includes a plurality of first recesses facing one side surface of the reflective mirror and spaced apart from each other, wherein the second guide part includes a plurality of second recesses facing the other side surface of the reflective mirror and spaced apart from each other, wherein the adhesive is disposed in the plurality of first and second recesses and adheres to the one side surface and the other side surface of the reflective mirror, wherein the adhesive adheres to different regions of the one side surface and the other side surface of the reflective mirror, and wherein the reflective mirror has a thickness of 0.5 mm or less.

14. The reflective module of claim 13, wherein the adhesive extends to a portion of an upper surface of the reflective mirror.

15. The reflective module of claim 13, wherein a distance between upper surfaces of adjacent first recesses and a distance between adjacent second recesses are greater than a depth of each of the first and second recesses.

16. The reflective module of claim 13, wherein the adhesive is accommodated in each of the first and second recesses and protrudes higher than each side surface of the reflective mirror facing each of the first and second recesses, wherein the plurality of first recesses faces different regions of the one side surface of the reflective mirror, have inclined surfaces, and are disposed at different heights, and wherein the plurality of second recesses faces different regions of the other side surface of the reflective mirror, have inclined surfaces, and are disposed at different heights.

17. The reflective module of claim 13, wherein the plurality of first recesses and the adhesive accommodated in the plurality of first recesses are separated from each other on the one side surface of the reflective mirror, and wherein the plurality of second recesses and the adhesive accommodated in the plurality of second recesses are separated from each other on the other side surface of the reflective mirror.

18. The reflective module of claim 13, wherein each of the first and second recesses includes a first surface inclined at an upper portion, a second surface inclined at a lower portion, and a bottom connecting the first surface and the second surface, and wherein an inner angle of each of the first to second recesses is in a range of 80 degrees to 90 degrees.

19. The reflective module of claim 13, wherein the inclined bottom surface of the holder includes a plurality of spacers spaced apart from a lower surface of the reflective mirror at each corner of the inclined bottom surface, and wherein the holder includes stop protrusions at both sides of a lower end of the reflective mirror to prevent movement of the reflective mirror.

20. A camera module comprising:
a lens module aligned in an optical axis direction;
an image sensor module; and
a reflective module, the reflective module according to claim 13,
wherein the reflective module comprises:
a first housing into which the holder is coupled;
a holder guide portion coupled to a rear side of the holder and guiding rotation of the holder;
a back cover coupled to a rear side of the holder guide portion; and
a cover having an opening portion in a region opposite to an upper surface of the reflective mirror on an upper portion of the first housing,
wherein the holder guide portion includes a plurality of first and second protrusions coupled to a groove disposed at the rear side of the holder and a groove disposed at a front side of the back cover.

* * * * *